United States Patent
Dawe et al.

(10) Patent No.: US 10,619,001 B2
(45) Date of Patent: Apr. 14, 2020

(54) POLYURETHANE FOAM FORMING COMPOSITION INCLUDING TRIGLYCERIDES, POLYURETHANE FOAM MADE FROM THE COMPOSITION, AND METHOD OF MAKING POLYURETHANE FOAM

(71) Applicant: LEAR CORPORATION, Southfield, MI (US)

(72) Inventors: Robert D. Dawe, Sarnia (CA); Edmund J. Madaj, Manchester, MI (US); Ashford A. Galbreath, Troy, MI (US); Asad S. Ali, Troy, MI (US)

(73) Assignee: LEAR CORPORATION, Southfield, MI (US)

( * ) Notice: Subject to any disclaimer, the term of this patent is extended or adjusted under 35 U.S.C. 154(b) by 126 days.

(21) Appl. No.: 14/208,664

(22) Filed: Mar. 13, 2014

(65) Prior Publication Data
US 2014/0275304 A1    Sep. 18, 2014

Related U.S. Application Data

(60) Provisional application No. 61/783,783, filed on Mar. 14, 2013.

(51) Int. Cl.
| | |
|---|---|
| *C08G 18/08* | (2006.01) |
| *C08G 18/32* | (2006.01) |
| *C08G 18/48* | (2006.01) |
| *C08G 18/66* | (2006.01) |
| *C08K 5/103* | (2006.01) |
| *C08G 101/00* | (2006.01) |

(52) U.S. Cl.
CPC ..... *C08G 18/4825* (2013.01); *C08G 18/3275* (2013.01); *C08G 18/48* (2013.01); *C08G 18/6688* (2013.01); *C08G 18/0838* (2013.01); *C08G 2101/00* (2013.01); *C08G 2101/0083* (2013.01); *C08K 5/103* (2013.01)

(58) Field of Classification Search
CPC ............ C08G 18/0838; C08G 18/4825; C08G 18/3275; C08G 18/48; C08G 18/6688; C08G 2101/00; C08G 2101/0083; C08K 5/103
See application file for complete search history.

(56) References Cited

U.S. PATENT DOCUMENTS

| | | |
|---|---|---|
| 4,130,698 A | 12/1978 | Sparrow et al. |
| 5,229,427 A | 7/1993 | Madaj |
| 6,180,686 B1 | 1/2001 | Kurth |
| 6,465,569 B1 | 10/2002 | Kurth |
| 6,573,354 B1 | 6/2003 | Petrovic et al. |
| 6,624,244 B2 | 9/2003 | Kurth |
| 6,864,296 B2 | 3/2005 | Kurth |
| 6,881,763 B2 | 4/2005 | Kurth |
| 7,084,230 B2 | 8/2006 | Kurth et al. |
| 7,211,616 B2 | 5/2007 | Kaszubski et al. |
| 7,537,665 B2 | 5/2009 | Kurth et al. |
| 8,318,820 B2 | 11/2012 | Guelcher et al. |
| 2002/0151613 A1* | 10/2002 | Falke ............ C08G 18/092 521/155 |
| 2004/0266900 A1* | 12/2004 | Neff ............ C08G 18/2825 521/155 |
| 2009/0143495 A1 | 6/2009 | Nozawa et al. |
| 2009/0270520 A1 | 10/2009 | Sasaki et al. |
| 2010/0184879 A1 | 7/2010 | Stanciu et al. |
| 2010/0197820 A1* | 8/2010 | Suppes ............ C11C 3/04 521/156 |

FOREIGN PATENT DOCUMENTS

WO    2009026426 A1    2/2009

OTHER PUBLICATIONS

Hartman et al., "Determination of Hydroxyl Value in Fats and Oils Using an Acid Catalyst", Analyst, vol. 112 (Year: 1987).*

* cited by examiner

*Primary Examiner* — Melissa A Rioja
(74) *Attorney, Agent, or Firm* — Brooks Kushman P.C.

(57) ABSTRACT

The present disclosure relates to a method of making polyurethane foam, the method comprising providing a polyol mixture comprising polyether polyol and unmodified vegetable oil having a hydroxyl number of less than 10; and reacting isocyanate with the polyol mixture to form a polyurethane foam, wherein the unmodified vegetable oil does not react and does not form part of the polyurethane foam. The present disclosure also relates to polyurethane formed by the method and polyurethane compositions.

13 Claims, 2 Drawing Sheets

POLYURETHANE FOAM FORMING COMPOSITION INCLUDING TRIGLYCERIDES, POLYURETHANE FOAM MADE FROM THE COMPOSITION, AND METHOD OF MAKING POLYURETHANE FOAM

CROSS-REFERENCE TO RELATED APPLICATIONS

This application claims the benefit of U.S. provisional application Ser. No. 61/783,783 filed Mar. 14, 2013, the disclosures of which is hereby incorporated in its entirety by reference herein.

FIELD OF THE DISCLOSURE

The present disclosure relates to polyurethane foam forming compositions including triglycerides, polyurethane foams formed from the composition and methods of making the same.

BACKGROUND

Due to their widely ranging mechanical properties and their ability to be relatively easily machined and formed, polyurethane foams have found wide use in a multitude of industrial and consumer applications. In particular, polyurethane foams have been found to be well suited for many applications. Automobiles, for instance, contain a number of components, such as seat cushions and vehicle interior components, such as headrests, that include polyurethane foams. Such polyurethane foams are typically categorized as flexible, semi-rigid, or rigid foams with flexible foams generally being softer, more pliable, and more subject to structural rebound subsequent to loading than rigid foams.

Polyurethanes are formed when isocyanate (NCO) groups (or A-side reactants) react with hydroxyl (OH) and other active hydrogen groups (or B-side reactants). Specifically, a carbamate linkage (or urethane bond) is formed upon the reaction between an isocyanate group and a hydroxyl group. The polyurethane polymer-forming reaction occurs between substances with more than one isocyanate group per molecule (or A-side reactants) and substances with more than one hydroxyl or other active hydrogen group per molecule (B-side reactants). The most common method of polyurethane production is via the reaction of a polyol (a B-side reactant) and an isocyanate (an A-side reactant) which forms the backbone urethane group. A cross-linking agent may also be added. Depending on the desired qualities of the final polyurethane product, the precise formulation may be varied. Variables in the formulation include the type and amounts of each of the reactants.

"Compression set" is the permanent deformation that takes place in foam after being compressed for an extended period of time. Polyurethane foams used in the automotive industry are exposed to significant stresses during normal use. Undesirable compression set can adversely affect appearance and performance of foam components. As such, lower values of compression set are desirable. Most foam customers specify the conditions for the testing for compression set and also have maximum levels allowed for compression set. These are some of the more challenging specifications to meet and they are becoming more so as efforts are made to use naturally-sourced materials and non-fugitive catalysts.

Thus, there is a need to provide a high quality polyurethane product having acceptable compression set while minimizing environmental impact.

BRIEF SUMMARY OF THE DISCLOSURE

The present disclosure generally provides a composition and a method of making a relatively high quality polyurethane product. It has been found that incorporating unmodified vegetable oil having a hydroxyl number of less than 10, such as consumer grade soybean oil, into the polyol composition (the B-side reactants) of a polyurethane composition provides a polyurethane foam that has a favorable compression set. In certain embodiments, the polyol composition has no more than 25 parts unmodified vegetable oil based on 100 parts of the polyol composition. The polyol composition can react with either MDI or TDI (the A-side reactants) to form polyurethane foam. In certain embodiments, the unmodified vegetable oil does not react with the components of the polyurethane composition and does not form any part of the resulting foam. It is believed that the vegetable oil, while physically incorporated into the foam, is not chemically bound to the foam. Depending on the choice of isocyanate and polyols, the foam is suitable for a number of applications ranging from automotive seating to rigid structural polyurethane parts.

DETAILED DESCRIPTION

Figure 1:
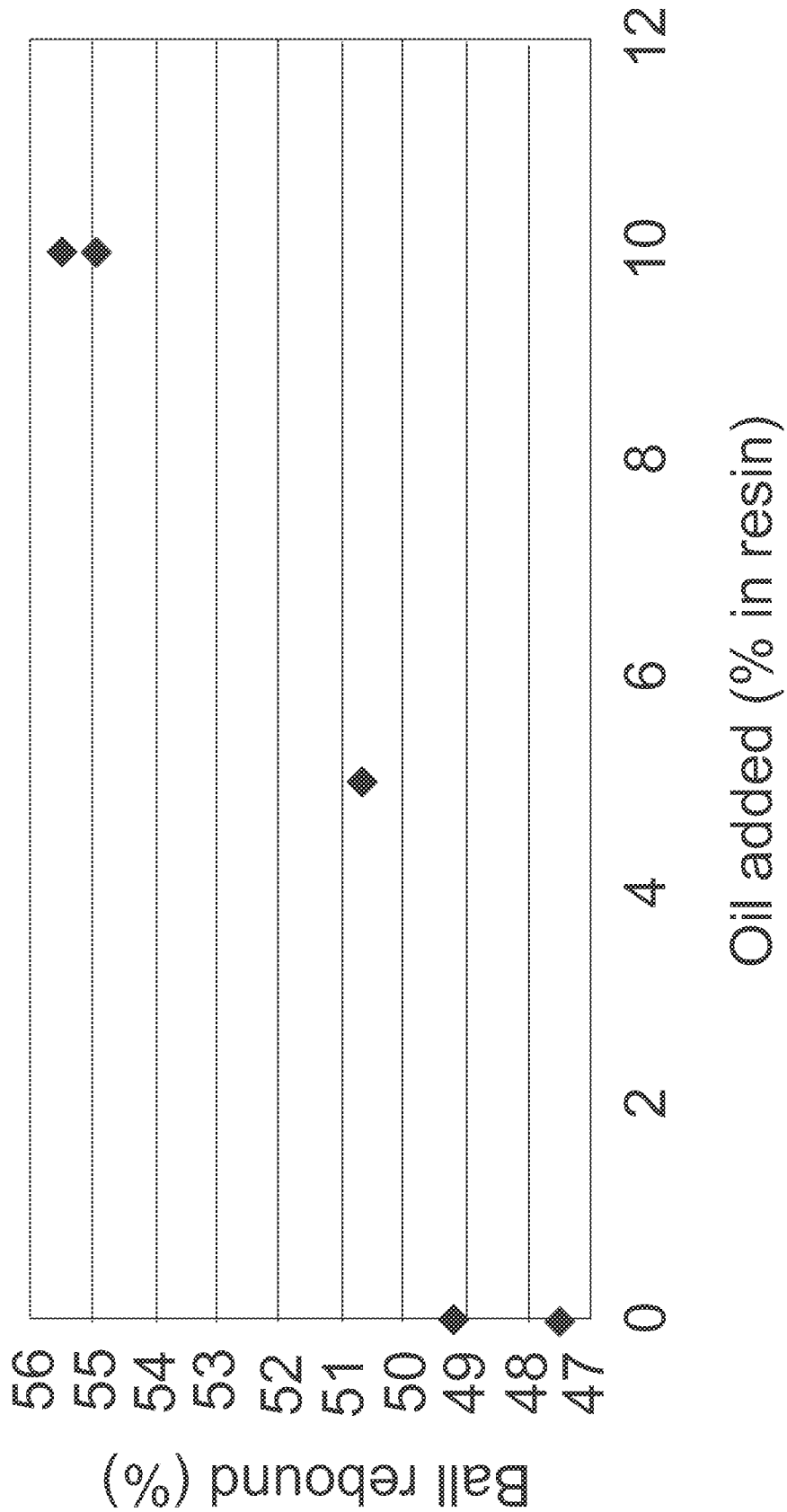
FIG. 1 illustrates the ball rebound results of Example 2.

As required, detailed embodiments of the present disclosure are disclosed herein; however, it is to be understood that the disclosed embodiments are merely examples of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Examples of the present disclosure provide polyurethane foam forming compositions including unmodified vegetable oil, polyurethane foams formed from the composition and methods of making the same.

In accordance with various embodiments, the present disclosure provides compositions for making polyurethane foam, wherein the composition comprises, preferably consists essentially of, and more preferably consists of:

|  | Component | one embodiment (Parts) | another embodiment (Parts) | another embodiment (Parts) | another embodiment (Parts) | another embodiment (Parts) |
|---|---|---|---|---|---|---|
| "B" side resin | Polyether polyols | 85-98 | 88-95 | 90-93 | 91 | 91 |
|  | Crosslinker (Diethanolamine) | 0-5 | .5-4 | .8-2 | 1 | 1 |
|  | Surfactant | 0-2 | 0.3-1 | 0.4-0.8 | 0.5 | 0.5 |
|  | Catalysts | 0.1-1 | 0.2-0.8 | 0.3-0.5 | 0.4 | 0.4 |
|  | Water | 2-6 | 3-5 | 3.5-4.5 | 4.2 | 4.2 |
|  | Soybean oil | .1-25 | 2-15 | 3-10 | 5 | 10 |
| Isocyanate | MDI | 50-100 | 55-75 | 55-65 | 61 | 61 |

In other embodiments, the composition comprises, preferably consists essentially of, and more preferably consists of:

|  | Component | one embodiment (Parts) | another embodiment (Parts) | another embodiment (Parts) | another embodiment (Parts) |
|---|---|---|---|---|---|
| "B" side resin | Polyether polyols | 0-95 | 50-90 | 60-90 | 69 |
|  | Soy polyols | 0-95 | 0-50 | 0-30 | 25 |
|  | Diethanolamine | 0-5 | .5-4 | 1-2 | 1.6 |
|  | Surfactant | 0-2 | 0.3-1 | 0.5-1 | 0.93 |
|  | Catalysts | 0.1-1 | 0.2-0.8 | 0.3-0.6 | 0.4 |
|  | Water | 2-6 | 2.5-5 | 3-4 | 3 |
|  | Soybean oil | 0.1-25 | 2-15 | 5-15 | 7 |
| Isocyanate | TDI | 25-60 | 30-50 | 35-45 | 37 |

Any suitable unmodified vegetable oil can be used. In at least one embodiment, a suitable unmodified vegetable oil has a hydroxyl number of less than 10. In other embodiments, a suitable unmodified vegetable oil has a hydroxyl number of 1 to 9, in yet other embodiments of less than 5, in yet other embodiments of 1 to 4, in even still yet other embodiments of 2-3, and in even still yet further other embodiments of 0.

The unmodified vegetable oil may be any suitable unmodified (not purposefully oxidized to introduce oxygen moieties into the fatty acid portions of the triglyceride) oil having such as unmodified soybean oil, palm oil, canola oil, rapeseed oil, castor oil, or olive oil. Any other unmodified non-petroleum based oil may be used without falling beyond the scope or spirit of the present disclosure.

In one specific example, the unmodified vegetable oil is soybean oil. Soybean oil, and other plant based oils, is a mixture of triglycerides, i.e., triesters of glycerol and fatty acids. A triglyceride may have the general structure as follows:

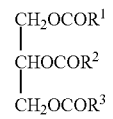

where $R^1$, $R^2$, and $R^3$ can have any of a number of structures. A naturally occurring triglyceride typically exists as a mixture of different structures in which $R^1$, $R^2$, and $R^3$ vary from structure to structure.

A fatty acid is a carboxylic acid and may have a general formula of $HO_2CR$, where R is usually an unbranched aliphatic chain attached to a carboxyl group. The chain may contain double or triple bonds. Other functional groups may also be present, such as hydroxyl groups, as in ricinoleic acid.

The most common R groups in vegetable oils are listed in Table 1 below as follows:

| R | Name of Fatty Acid Containing R |
|---|---|
| $(CH_2)_2CH_3$ | Butyric |
| $(CH_2)_4CH_3$ | Caproic |
| $(CH_2)_6CH_3$ | Caprylic |
| $(CH_2)_8CH_3$ | Capric |
| $(CH_2)_{10}CH_3$ | Lauric acid |
| $(CH_2)_{12}CH_3$ | Myrisitc |
| $(CH_2)_{14}CH_3$ | Palmitic |
| $(CH_2)_{16}CH_3$ | Stearic |
| $(CH_2)_{18}CH_3$ | Arachidic |
| $(CH_2)_{20}CH_3$ | Behenic |
| $(CH_2)_7CH=CH(CH_2)_3CH_3$ | Myristoleic |
| $(CH_2)_7CH=CH(CH_2)_5CH_3$ | Palmitoleic |
| $(CH_2)_7CH=CH(CH_2)_7CH_3$ | Oleic |
| $(CH_2)_7CH=CHCH_2CH=CH(CH_2)_4CH_3$ | Linoleic |
| $(CH_2)_7CH=CHCH_2CH=CHCH_2CH=CHCH_2CH_3$ | Linolenic |

-continued

| R | Name of Fatty Acid Containing R |
|---|---|
| (CH$_2$)$_3$CH=CHCH$_2$CH=CHCH$_2$CH=CHCH$_2$CH=CH(CH$_2$)$_4$CH$_3$ | Arachidonic |
| (CH$_2$)$_7$CH=CHCH$_2$CH(OH)(CH$_2$)$_5$CH$_3$ | Ricinoleic |

It is to be noted that Table 1 is not exhaustive and that a number of other fatty acids may be present in triglycerides without falling beyond the scope or spirit of the present disclosure.

More specifically, the unmodified vegetable oil may be consumer grade vegetable oil, such as consumer grade soybean oil, such as is found in any grocery store, such as Crisco.

In at least one embodiment, the unmodified consumer grade vegetable oil comprises oils of refined, bleached, and deodorized canola (rapeseed or low erucic acid rapeseed), corn, cottonseed, olive (refined), peanut, safflower, soybean, sesame, sunflower, or any other vegetable oil or combination of these oils. In at least another embodiment, the unmodified consumer grade vegetable oil comprises refined, bleached, and deodorized corn oil, cottonseed oil, or a combination of both. In at least another embodiment, the unmodified consumer grade vegetable oil comprises refined, bleached, partially hydrogenated, and deodorized soybean oil or refined, bleached, and deodorized peanut oil.

Moreover, the unmodified vegetable oil can be provided directly from a processor, such as Zeeland Farm Services. In at least one embodiment, the unmodified soybean oil is refined, bleached, deodorized (RBD) food-grade oil, such as the soybean oil available from Zeeland Farm Services.

In at least one embodiment, the unmodified vegetable oil comprises substantially a 90% refined bleached deodorized vegetable oil. In at least another embodiment, the unmodified sunflower oil comprises substantially 100% refined bleached deodorized sunflower oil.

In at least one embodiment, the unmodified vegetable oil has the following fatty acid composition in wt %, based on the total weight of the fatty acid in the unmodified vegetable oil:

| Fatty Acid | One Embodiment | Another Embodiment | Yet Another Embodiment |
|---|---|---|---|
| C16:0 Palmitic | 5-15 | 7.5-12.5 | 10.18 |
| C18:0 Stearic | 3-8 | 3.5-6 | 4.45 |
| C18:1 Oleic | 15-35 | 18-30 | 22.41 |
| C18:2 Linoleic | 35-65 | 45-60 | 53.23 |
| C18:3 Linolenic | 4-12 | 5.5-8.5 | 7.51 |
| Other fatty acids | Remainder to 100 | Remainder to 100 | Remainder to 100 |

In at least one embodiment, the unmodified sunflower oil has the following fatty acid composition in wt %, based on the total weight of the fatty acid in the unmodified sunflower oil:

| Fatty Acid | One Embodiment | Another Embodiment | Yet Another Embodiment |
|---|---|---|---|
| C16:0 Palmitic | 5-15 | 7.5-12.5 | 10.18 |
| C18:0 Stearic | 3-8 | 3.5-6 | 4.45 |
| C18:1 Oleic | 15-35 | 18-30 | 22.41 |
| C18:2 Linoleic | 35-65 | 45-60 | 53.23 |
| C18:3 Linolenic | 4-12 | 5.5-8.5 | 7.51 |
| Other fatty acids | Remainder to 100 | Remainder to 100 | Remainder to 100 |

In at least one embodiment, the unmodified vegetable oil has free fatty acid (FFA) value of 0.15% max of oleic acid as measured according to ACOS Method Ca5a-40, in other embodiments of 0.10% max of oleic acid, and in yet another embodiment of 0.05% max of oleic acid.

In at least one embodiment, the unmodified sunflower oil has free fatty acid (FFA) value of 0.15% max of oleic acid as measured according to ACOS Method Ca5a-40, in other embodiments of 0.10% max of oleic acid, and in yet another embodiment of 0.05% max of oleic acid.

In at least one embodiment, the unmodified vegetable oil has a peroxide value of 3.0 max as measured according to Cd8-53, in other embodiments of 2.0 max, and in yet another embodiment of 1.0 max.

In at least one embodiment, the unmodified sunflower oil has a peroxide value of 3.0 max as measured according to Cd8-53, in other embodiments of 2.0 max, and in yet another embodiment of 1.0 max.

In at least one embodiment, suitable unmodified vegetable oil, such as unmodified soybean oil, has a relatively low hydroxyl number, acid value and viscosity, as shown below:

| | RBD food-grade oil |
|---|---|
| Viscosity | <100 cP |
| Hydroxyl number | <10 |
| Acid value | <0.2 |
| | (based on oleic acid) |

In at least another embodiment, suitable unmodified vegetable oil, such as unmodified soybean oil, has a relatively low hydroxyl number, acid value and viscosity, as shown below:

| | RBD food-grade oil |
|---|---|
| Viscosity | 54 cP |
| Hydroxyl number | <5 |
| Acid value | <0.1 |
| | (based on oleic acid) |

The unmodified vegetable oil does not react with the other polyurethane forming components and does not form part of the resulting polyurethane. Since the oil does not react, most of it can be extracted using a hydrocarbon solvent like pentane. If the oil had been incorporated into the polymer matrix it would not be able to be extracted. While the mechanism is not known with certainty, it is suspected that the oil acts as a "lubricant" to allow polymer segments to move more freely, resulting in improved resilience and lower compression set.

The polyol content can comprise any suitable polyols. For instance, it may contain polyether polyol(s), soy polyol(s), a mixture of polyether polyol(s) and soy polyol(s), or any other suitable polyols and polyol combinations.

In certain embodiments, the polyol is a polyether polyol. For example, a general description of a polyether polyol that may be used in accordance with an example of the present disclosure includes polymers formed by the addition of alkylene oxide monomers to an initiator compound containing two or more active hydrogen atoms. That is, the active hydrogen compound in the presence of a catalyst initiates a ring opening and an oxide addition, which continue until the desired molecular weight is obtained. In one example, the preferred alkylene oxides are propylene oxide and ethylene oxide. Polymers may be formed from one or more of the following or similar initiators: water, ethylene glycol, propylene glycol, dipropylene glycol, glycerine, trimethylolpropane, ethylene diamine, pentaerythritol, diethylene triamine, sorbitol, and sucrose. Example of some trade names for the polyols described above and useful in this disclosure are Bayer's Multraol 3901, Dow Chemical's Voranol™ 5815, Voractiv™ DVV6340, Voranol™ 4240; Bayer MaterialScience's Multranol™ 3901 and BASF's Pluracol™ 1596. Furthermore, graft (or "filled") copolymer polyol produced by free radical polymerization of styrene and acrylonitrile ("SAN") in situ with a polyether polyol have proven to be useful in this disclosure; Dow Chemical's Specflex™ NC701 and BASF Pluracol™ 1528 are examples of these type of polyols. Another class of copolymer polyol suitable in this example may be produced by the step-growth polymerization of hydrazine with tolylene diisocyanate or alkanolamine with an isocyanate in the presence of a polyether polyol; an example of the former is Bayer MaterialScience's Multranol™ 9151.

In certain embodiments, a suitable polyol comprises an ethylene oxide-propylene oxide copolymer polyether polyol with average functionality (number of hydroxyl groups per molecule) greater than 1 and less than about 5, and in yet other embodiments of about 2.2-3.5. The molecular weight may be between about 200 and about 10,000, and in yet other embodiments between about 1,500 to about 6,500. One particularly suitable polyol is a block copolymer of propylene oxide and ethylene oxide in which the ethylene oxide block is at the terminus of the chain. For example, polyols with a tradename of Multranol™ 3901 by Bayer, Multranol™ E-863 from Bayer, Voranol™ 5815 by Dow or Specflex™ NC-630 by Dow may be used. In some embodiments, the soy polyol Agrol™ 3.6 from BioBased has been found to be suitable.

Any other suitable components can be used with the polyol composition. For instance, suitable conventional additives such as crosslinker, surfactants, catalysts and blowing agents can be used. While any suitable crosslinker can be used, in at least one embedment the crosslinker diethanolamine has found to produce satisfactory results. While any suitable surfactants can be used, in at least one embedment the surfactant Tegostab B8734LF2 from Evonik has found to produce satisfactory results. While any suitable catalysts can be used, in at least one embedment the catalysts Jeffcat ZF-10 and Jeffcat ZR-50 from Huntsman has found to produce satisfactory results.

The unmodified vegetable oil and any other B-side components are mixed with the polyol to define a vegetable oil-polyol mixture. The mixture is then reacted with isocyanate to produce foam. In at least one embodiment, the "B" side resin is mixed with and appropriate amount of isocyanate (stoichiometric ratio between 0.6 and 1.2 isocyanate to resin) and well mixed (high-speed stirrer or high-pressure impingement) for a brief time, such as for 10 seconds.

Any suitable isocyanate can be used, such as isoocyanates containing about two or more isocyanato groups per molecule. In one embodiment, the isocyanate may be any suitable isocyanate such as one of 1,1'-methylenebis[isocyanatobenzene] (MDI), polymethylenepolyphenylene isocyanate (polymeric MDI), and all isomers and isomer ratios of toluene diisocyanate (TDI). Other isocyanates may be use without falling beyond the scope or spirit of the present disclosure.

The polyol composition having vegetable oil, such as soybean oil, has several effects. Firstly, it "opens" the foam making it less tight at demold and less prone to shrinkage as it cures. It should be understood that, a foam that contains intact or fully enclosed cells is considered to be "tight" whereas a foam that contains a high percentage of ruptured cells, which allows free flow of gases through the foam, is considered to be "open". Gas diffusion and contraction on cooling can cause a tight foam to shrink and deform. In an open foam, gas can flow freely throughout the foam and no, or a much smaller amount of, such shrinkage is seen. Cell rupture can be achieved by controlling the timing of certain stages of foam formation, by adding materials that induce rupture or rapid pressure changes after the foam is made. It has been found that vegetable oil has an effect similar to cell opening polyols such as Voranol CP1421 or Multranol 9199. These polyols are rich in ethylene oxide units and have limited solubility in the foam as it forms. Tightness in foam is typically countered by adding cell openers, which are a specialized type of value-added polyol, or by mechanically crushing the foam after it has been demolded. In the case of very tight foam, the foam may split when it is crushed resulting in scrapped parts. Vegetable oil, such as soybean oil, can displace some or all of the expensive cell opener or can be used to decrease the amount of mechanical crushing needed.

A particularly useful advantage of using a vegetable oil, such as soybean oil, is that it decreases the tendency of foam to take a permanent deformation after being compressed for prolonged periods. This permanent deformation is referred to as compression set. Lower values of compression set are desirable. Most foam customers specify the conditions for the testing for compression set and also have maximum levels allowed for compression set. These are some of the more challenging specifications to meet and they are becoming more so as efforts are made to use naturally-sourced materials and non-fugitive catalysts. In at least certain embodiments, polyurethane foam made according to the compositions of the present disclosure have a compression set of less than 25%, when measured according to ASTM D-3574 at 75% dry composition set, in other embodiments of less than 18%, and in yet other embodiments of less than 14%. In at least certain embodiments, polyurethane foam made according to the compositions of the present disclosure have a compression set of 1-24%, when measured according to ASTM D-3574 at 75% dry composition, in other embodiments of 2-18%, and in yet other embodiments of 3-14%.

Example 1

Foams made using TDI as the isocyanate and containing either 0 or 5% soybean oil in the resin were prepared. The isocyanate (at approximately 20 C) was added to the resin (also at 20 C) and mixed vigorously for 5-7 seconds with a motor-driven stirrer. The mixture was transferred to an aluminum mold, which was at heated to 65 C. The mold was closed and after 5 minutes the foam was demolded and crushed lightly by hand. Foam properties were measured seven days after the foam was produced. The testing was performed according to ASTM D-3574. Ball rebound is a measure of the resiliency of foam, and higher values are better.

| Oil content in resin | 75% dry compression set | 50% dry compression set | Ball rebound |
|---|---|---|---|
| 0% | 22% | 18% | 44% |
| 5% | 13% | 12% | 48% |

Example 2

Similar MDI based foams were made and tested based on the compositions shown in the below table.

|  | Component | Parts | Parts | Parts |
|---|---|---|---|---|
| "B" side resin | Polyether polyols | 91 | 91 | 91 |
|  | Soy polyols | 0 | 0 | 0 |
|  | Diethanolamine | 1 | 1 | 1 |
|  | Surfactant | 0.5 | 0.5 | 0.5 |
|  | Catalysts | 0.4 | 0.4 | 0.4 |
|  | Water | 4.2 | 4.2 | 4.2 |
|  | Unmodified Soybean oil | 0 | 5 | 10 |
| Isocyanate | MDI | 61 | 61 | 61 |

Figure 2:
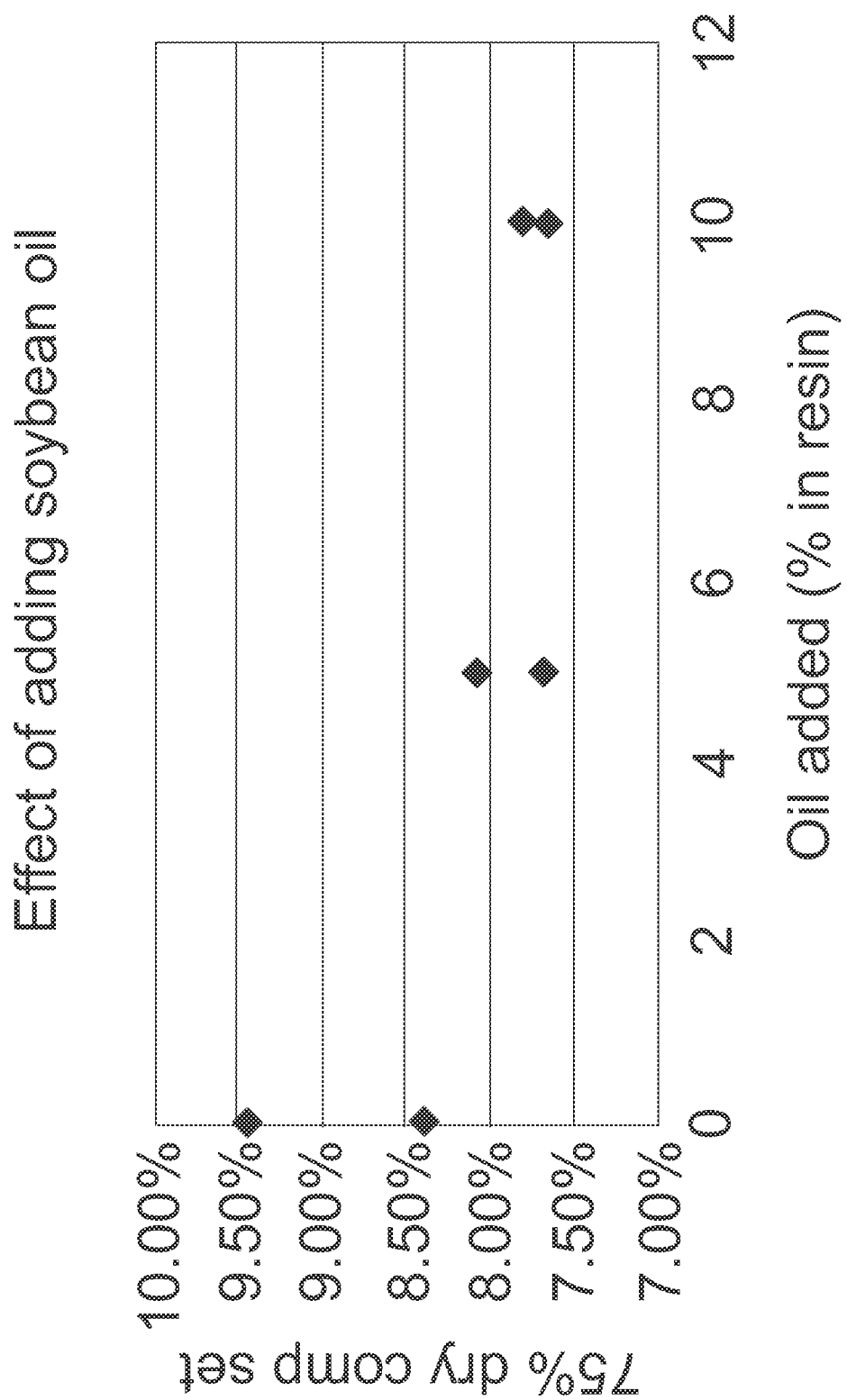
FIG. 2 illustrates the 75% dry compression set results of Example 2.

The tests were conducted in duplicate and the results are shown in FIGS. 1 and 2.

In certain embodiments, the unmodified soybean oil comprises food grade soybean oil, either Crisco (not the type used for deep-frying as it has a defoamer added to it) which can be purchased from a local supermarket or 100% refined deodorized bleached food grade oil available from Zeeland Food Services of Zeeland Mich. The following is from the certificate of analysis for this material.

| Typical Analytical Specifications using AOCS methods. | | |
|---|---|---|
| Attributes AOCS Method Typical Color (Lovibond Red) | Cc13d-55 | 1.5 Red Max |
| Free Fatty Acid (FFA) | Ca5a-40 | .05% Max of Oleic Acid |
| Peroxide Value | Cd8-53 | 1.0 Max (if Rail 1.5 max) |
| Flavor |  | Bland |
| Moisture | Ca2e-84 | 0.10% Max |
| Iodine Value (MEQ/KG) | Cd1d-92 | 125-139 |
| OSI | Cd12b-92 | >8 Hrs Min |
| *Cold Test | Cc 11-53(03) | >24 hrs |

In other embodiments, the unmodified soybean oil comprises food grade canola oil, which can be purchased from a local supermarket, and having a hydroxyl number less than 1.

Unmodified soybean oil and other unmodified vegetable oil, such as canola oil, has a number of advantages. It delivers some biobased content into foam, which is a marketing and promotional asset. More importantly it is a functional additive that improves some important foam properties and helps meet increasingly stringent customer requirements. Some of this effect could be achieved by using more expensive petroleum-based materials (like cell openers), but in other respects unmodified soybean oil having an OH #<10, and other unmodified vegetable oils having an OH #<10 are unique in their ability to improve compression set and resilience. Finally, soybean oil, plus other vegetable oils, represents an overall cost savings for any given formulation. Soybean oil, plus other vegetable oils, sells at about half the cost per pound of conventional polyether polyols.

While the present disclosure has been described in terms of preferred embodiments, it will be understood, of course, that the disclosure is not limited thereto since modifications may be made to those skilled in the art, particularly in light of the foregoing teachings.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of making polyurethane foam, the method comprising:
   providing a polyol mixture comprising polyether polyols and unmodified vegetable oil having a hydroxyl number of less than 10; and
   reacting isocyanate with the polyol mixture to form a polyurethane foam, wherein the unmodified vegetable oil does not react with the polyether polyols or the isocyanate,
   wherein the isocyanate comprises 1,1'-methylenebis(isocyanatobenzene) and is provided in an amount of 50-100 parts by weight per 100 parts by weight of the polyol mixture, the unmodified vegetable oil comprises soybean oil, and the polyol mixture comprises:

| Component | Parts by weight per 100 parts by weight |
|---|---|
| Polyether polyols | 85-98 |
| Soy polyols | 0 |
| Crosslinker | 0-5 |
| Surfactant | 0-2 |
| Catalysts | 0.1-1 |
| Water | 2-6 |
| Soybean oil | 0.1-25. |

2. The method of claim 1 wherein the unmodified vegetable oil has a hydroxyl number of 1 to 9.

3. The method of claim 1 wherein the unmodified vegetable oil has a hydroxyl number of 2 to 3.

4. The method of claim 1 wherein the unmodified vegetable oil has a hydroxyl number of 0.

5. A method for forming a polyurethane foam, the method comprising:
   reacting a polyol composition with isocyanate to form a flexible polyurethane, the polyol composition comprising polyether polyols and unmodified vegetable oil having a hydroxyl number of less than 10
   wherein the unmodified vegetable oil does not react during the reaction with the polyol or the isocyanate, wherein the isocyanate comprises 1,1'-methylenebis(isocyanatobenzene) and is provided in an amount of 50-100 parts by weight per 100 parts by weight of the polyol composition, the unmodified vegetable oil comprises soybean oil, and the polyol composition comprises:

| Component | Parts by weight per 100 parts by weight |
|---|---|
| Polyether polyols | 85-98 |
| Soy polyols | 0 |
| Crosslinker | 0-5 |
| Surfactant | 0-2 |
| Catalysts | 0.1-1 |
| Water | 2-6 |
| Soybean oil | 0.1-25. |

6. The method of claim 5 wherein the unmodified vegetable oil has a hydroxyl number of 1 to 9.

7. The method of claim 5 wherein the unmodified vegetable oil has a hydroxyl number of less than 5.

8. The method of claim 5 wherein the polyurethane foam has a compression set of 10% to 15% as measured according to ASTM D-3754.

9. A low compression set polyurethane foam comprising the reaction product of:
a polyol composition comprising polyether polyols and unmodified vegetable oil, the unmodified vegetable oil having a hydroxyl number of less than 10 per 100 parts by weight of the polyol composition; and
an isocyanate, wherein the isocyanate comprises 1,1'-methylenebis(isocyanatobenzene) and is provided in an amount of 55-75 parts by weight per 100 parts by weight of the polyol composition, the unmodified vegetable oil comprises soybean oil, and the polyol composition comprises:

| Component | Parts by weight per 100 parts by weight |
|---|---|
| Polyether polyols | 88-95 |
| Soy polyols | 0 |
| Crosslinker | .5-4 |
| Surfactant | 0.3-1 |
| Catalysts | 0.2-0.8 |
| Water | 3-5 |
| Soybean oil | 2-15. | wherein the polyurethane foam has a compression set of less than 18% when measured according to ASTM D-3574 at 75% dry compression set, and wherein the vegetable oil does not react during the reaction with the polyol or the isocyanate.

10. The polyurethane foam of claim 9 wherein the unmodified vegetable oil has a hydroxyl number of 1 to 10.

11. The polyurethane foam of claim 9 wherein the unmodified vegetable oil has a hydroxyl number of 0.

12. The polyurethane foam of claim 9 wherein the unmodified vegetable oil has a hydroxyl number of less than 5.

13. The polyurethane foam of claim 12 wherein the soybean oil is consumer grade soybean oil.

* * * * *